May 25, 1965   H. T. HOLSMAN   3,185,414
TUBULAR MULTIWIRE REINFORCING MEMBER AND METHOD OF MAKING
Filed Feb. 10, 1961
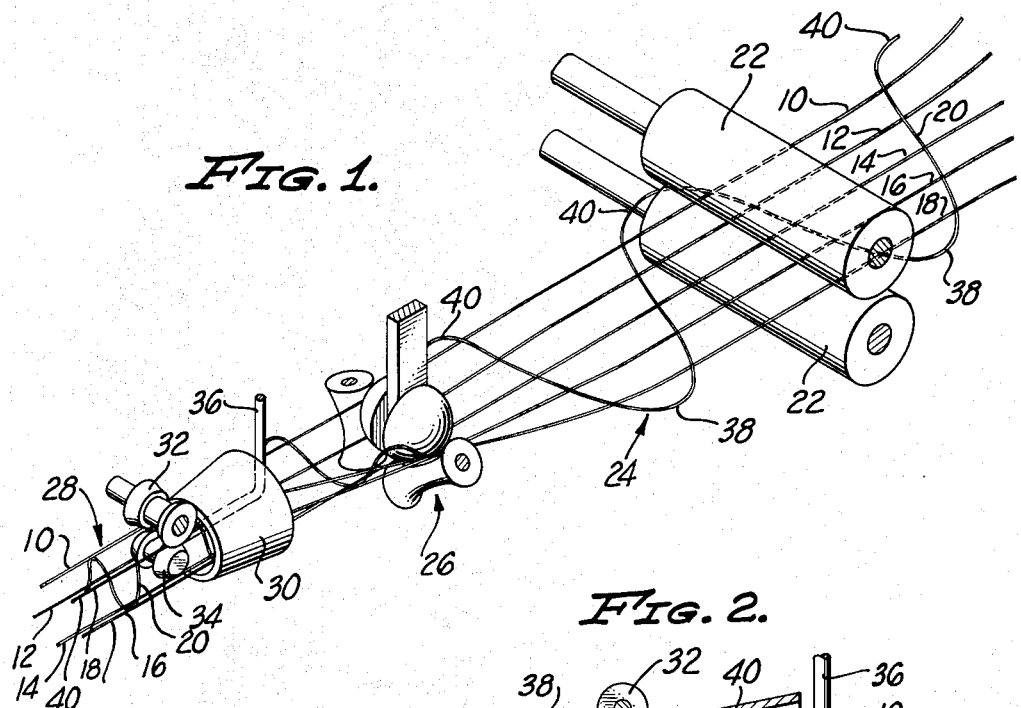
FIG. 1.
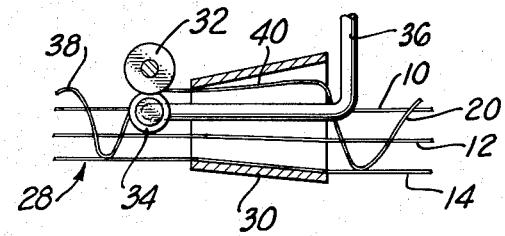
FIG. 2.
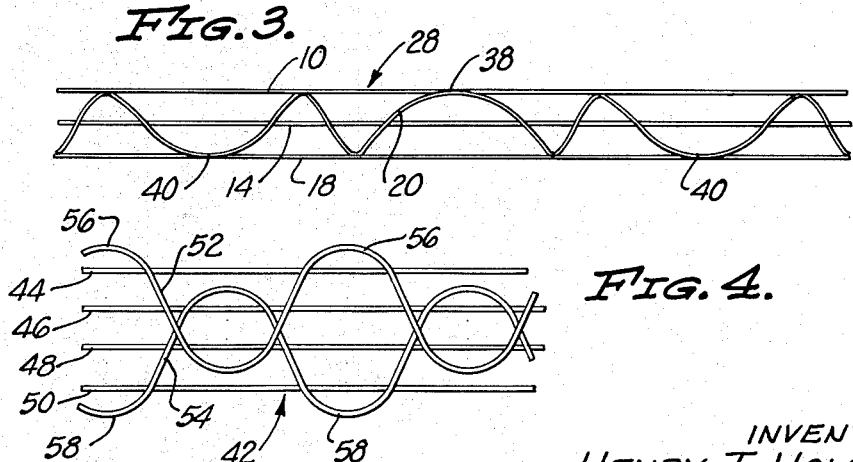
FIG. 3.
FIG. 4.
INVENTOR
HENRY T. HOLSMAN
BY HIS ATTORNEYS
HARRIS, KIECH, RUSSELL & KERN

United States Patent Office 3,185,414
Patented May 25, 1965

3,185,414
TUBULAR MULTIWIRE REINFORCING MEMBER
AND METHOD OF MAKING
Henry T. Holsman, 1045 Alston Road,
Santa Barbara, Calif.
Filed Feb. 10, 1961, Ser. No. 88,496
2 Claims. (Cl. 245—2)

The present invention relates in general to reinforcing members for concrete, or the like, and, more particularly, to tubular multiwire reinforcing members which may in many instances be substituted for conventional steel reinforcing rods.

Still more specifically, the invention contemplates a tubular reinforcing member of wire mesh which is much lighter in weight and requires much less steel than a conventional solid reinforcing rod of the same diameter, but which nevertheless provides adequate reinforcement in many applications. An important advantage of a tubular reinforcing member of wire mesh is that it provides a far greater surface area in contact with the concrete, as compared to a conventional solid reinforcing rod, and thus provides a much more intimate bond to the concrete. As a result, a tubular reinforcing member of wire mesh in many instances provides as much, or more, reinforcement as a conventional solid rod of the same diameter, but with a substantial saving in weight and steel.

A primary object of the invention is to provide a tubular multiwire reinforcing member comprising a strip of multiwire mesh rolled into a tube with portions of the wires at the edges of the strip overlapping and welded together. Such a tubular multiwire reinforcing member may be utilized as a substitute for a conventional solid reinforcing rod in the smaller sizes.

Another important object of the invention is to provide a method of making a tubular multiwire reinforcing member from a flat strip of multiwire mesh, including the steps of forming the strip into a tube with portions of the wires at the edges of the strip overlapping, and welding the overlapping portions together.

A further object is to provide a tubular multiwire reinforcing member composed of longitudinal wires and at least one sinusoidal wire forming a strip which is rolled into a tube with alternate crests of the sinusoidal wire forming one edge of the strip and overlapping and welded to the other edge thereof.

The foregoing objects, advantages, features and results of the present invention, together with various other objects, advantages, features and results thereof which will be evident to those skilled in the concrete reinforcing art, may be achieved with the exemplary embodiments of the invention described in detail hereinafter and illustrated in the accompanying drawing, in which:

FIG. 1 is a semidiagrammatic perspective view illustrating a method of the invention of making a tubular multiwire reinforcing member of the invention;

FIG. 2 is an enlarged, fragmentary longitudinal sectional view showing the operations of sizing a tube rolled from a flat strip of multiwire mesh and of welding overlapping edges of such strip together;

FIG. 3 is an elevational view of a tubular multiwire reinforcing member of the invention showing welded together the overlapping edges of a flat strip from which it was formed; and FIG. 4 is a plan view of an alternative flat strip which may be rolled into a tube with its edges overlapping and welded together to form another embodiment of a tubular multiwire reinforcing member of the invention.

Referring initially to FIG. 1 of the drawing, illustrated therein are longitudinal wires 10, 12, 14, 16 and 18 and a sinusoidal wire 20 being fed in overlapping relation between two welding rolls 22 to form a flat strip 24 of multiwire mesh. The strip 24 is formed continuously by continuously feeding the longitudinal wires 10, 12, 14, 16 and 18 to the welding rolls 22 from suitable supply means, not shown, and by continuously and simultaneously feeding the sinusoidal wire 20 to the welding rolls from a suitable forming means, not shown.

From the welding rolls 22, the strip 24 progresses continuously to a suitable rolling means 26 for rolling the strip into a tube 28 having its edges overlapping. The tube 28 passes through a sizing ring 30 which provides the tube with the proper diameter and which provides the proper overlap of the edges of the original flat strip 24. The overlapping edges of the strip 24 are then welded together by welding rolls 32 and 34 respectively located externally of and internally of the tube 28 and contoured to fit the tube. The inner welding roll 34 is mounted on an arm 36 which extends into the sized tube 28 through the sizing ring 30.

With the particular construction shown for the strip 24 in FIGS. 1 and 3 of the drawing, alternate crests 38 of the sinusoidal wire 20 overlap and are welded to the longitudinal wire 10 intermediate the intervening crests 40 of the sinusoidal wire. Conversely, the intervening crests 40 overlap and are welded to the longitudinal wire 18 intermediate the alternate crests 38.

Referring to FIG. 4, illustrated therein is an alternative flat strip 42 of multiwire mesh adapted to be rolled into a tube, not shown, with its edges overlapping and welded together to form a tubular multiwire reinforcing member. In the construction illustrated, the strip 42 includes longitudinal wires 44, 46, 48 and 50 and two sinusoidal wires 52 and 54 arranged 180° out of phase. The sinusoidal wire 52 overlaps and is welded to the longitudinal wires 44, 46 and 48, while the sinusoidal wire 54 overlaps and is welded to the longitudinal wires 46, 48 and 50 and the sinusoidal wire 52.

With the foregoing construction, alternate crests 56 of the sinusoidal wire 52 form one edge of the strip 42, while alternate and opposite crests 58 of the sinusoidal wire 54 form the opposite edge of the strip. When the strip 42 is rolled into a tube with its edges overlapping and welded together, by the rolling means 26, the sizing ring 30 and the welding rolls 32 and 34, the crests 56 and 58 overlaps and are welded together to form a tubular multiwire reinforcing member.

It will be understood that while two embodiments of the invention have been disclosed, various changes, modifications and substitutions may be incorporated in such embodiments, and the invention embodied in other embodiments, all without departing from the spirit of the invention as defined by the claims which follow.

I claim:
1. A tubular multiwire reinforcing member comprising a strip formed of a plurality of substantially straight, parallel wires extending longitudinally of said strip and at least one generally sinusoidal wire extending longitudinally of said strip and overlapping and welded to said substantially straight wires, alternate crests of said generally sinusoidal wire forming one edge of said strip, said strip being rolled into a cylindrical tube having open ends with said alternate crests of said generally sinusoidal wire overlapping and welded to the other edge of said strip.

2. A method of making a tubular multiwire reinforcing member from a plurality of wires, including the steps of: progressively longitudinally feeding a group of wires, including at least one generally sinusoidal wire, in plane, overlapping relation with at least alternate crests of said generally sinusoidal wire projecting laterally beyond the other wires of the group; progressively welding the wires together at the points of overlap to form a flat strip of multiwire mesh having spaced edges one of which is formed by said alternate crests of said generally sinusoidal wire; progressively forming said strip into a cylindrical tube having open ends with said alternate crests forming said one edge of said strip overlapping the other edge of said strip; and progressively welding said alternate crests forming said one edge of said strip to the portions of said other edge thereof which said alternate crests overlap together.

References Cited by the Examiner

UNITED STATES PATENTS

| | | | |
|---|---|---|---|
| 189,529 | 4/77 | Van Eps | 245—2 |
| 557,905 | 4/96 | Smith | 245—2 |
| 750,903 | 2/04 | Shrum et al. | 245—1 |
| 780,586 | 1/05 | Thurston | 245—2 |
| 868,065 | 10/07 | Barnes | 50—524 |
| 949,668 | 2/10 | Swinscoe | 245—2 |
| 1,324,024 | 12/19 | Barnes | 140—71 |
| 2,040,349 | 5/36 | Wagner | 140—71 |
| 2,439,548 | 4/48 | Planeta | 140—71 |
| 2,566,644 | 9/51 | Van der Togt | 140—71 |

CHARLES W. LANHAM, *Primary Examiner.*

WHITMORE A. WILTZ, *Examiner.*